US012221038B2

(12) United States Patent
Francus et al.

(10) Patent No.: US 12,221,038 B2
(45) Date of Patent: Feb. 11, 2025

(54) VEHICLE DOOR ASSEMBLY

(71) Applicant: Nissan North America, Inc., Franklin, TN (US)

(72) Inventors: Neil Francus, Plymouth, MI (US); David Prim, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 879 days.

(21) Appl. No.: 17/081,190

(22) Filed: Oct. 27, 2020

(65) Prior Publication Data

US 2022/0126761 A1 Apr. 28, 2022

(51) Int. Cl.
*B60R 11/02* (2006.01)
*B60J 5/04* (2006.01)
*B60R 13/02* (2006.01)
*B60R 11/00* (2006.01)

(52) U.S. Cl.
CPC ......... *B60R 11/0217* (2013.01); *B60J 5/0413* (2013.01); *B60R 13/0243* (2013.01); *B60R 2011/0021* (2013.01); *B60R 2013/0287* (2013.01)

(58) Field of Classification Search
CPC ............... B60J 5/0413; B60R 11/0217; B60R 2013/0287
See application file for complete search history.

(56) References Cited

U.S. PATENT DOCUMENTS

| | | | | |
|---|---|---|---|---|
| 5,736,689 | A | * | 4/1998 | Van Hout .............. H04R 1/025 181/150 |
| 8,103,041 | B2 | | 1/2012 | Koch et al. |
| 2004/0003959 | A1 | * | 1/2004 | Koizumi ............ B60R 11/0217 181/150 |
| 2004/0264729 | A1 | * | 12/2004 | Ito ........................... H04R 5/02 381/431 |
| 2005/0218694 | A1 | * | 10/2005 | Schoemann ........... B60J 5/0416 296/146.7 |
| 2008/0310668 | A1 | * | 12/2008 | Koch ..................... H04R 1/026 381/389 |
| 2013/0255067 | A1 | * | 10/2013 | Zellner, Jr. .......... B60R 11/0217 381/86 |
| 2019/0126844 | A1 | * | 5/2019 | Kim .................... B60R 11/0217 |
| 2020/0162809 | A1 | * | 5/2020 | Honji .................... B60J 5/0463 |
| 2021/0354535 | A1 | * | 11/2021 | Harada ............... B60R 11/0217 |

FOREIGN PATENT DOCUMENTS

WO WO 2006/101022 * 9/2006

* cited by examiner

*Primary Examiner* — Gregory J Strimbu
(74) *Attorney, Agent, or Firm* — Global IP Counselors, LLP

(57) ABSTRACT

A vehicle door assembly includes an interior trim panel having a projecting structure, a foam support structure and a foam member. The interior trim panel defines an audio speaker opening with the projecting structure at least partially surrounding the audio speaker opening. The foam support structure is shaped and dimensioned to attach to the projecting structure. The foam support structure has a receiving surface. The foam member is shaped to conform to the foam support structure and mounted to the receiving surface.

13 Claims, 12 Drawing Sheets

VEHICLE DOOR ASSEMBLY

BACKGROUND

Field of the Invention

The present invention generally relates to a vehicle body assembly that includes an audio speaker. More specifically, the present invention relates to a vehicle body assembly with an audio speaker that further includes an interior trim panel configured to support a foam support structure such that a foam member is retained between the foam support structure and the audio speaker.

Background Information

Vehicles often include audio systems with audio speakers installed in various locations throughout a passenger compartment of the vehicle. The audio speakers are typically installed to a structural element of the vehicle with a trim member or trim panel having an audio opening being installed to the structural element such that the audio opening aligns with the audio speaker.

SUMMARY

One object of the present disclosure is to provide a trim panel that includes an audio speaker opening with a foam support structure that aligns with an audio speaker opening and includes a foam receiving surface that receives a foam member that is held between the foam support member and an audio speaker in order to provide a cushioning characteristic (vibration dampening effect) to the trim panel.

In view of the state of the known technology, one aspect of the present disclosure is to provide a vehicle body assembly with an interior trim panel, a foam support structure and a foam member. The interior trim panel has a projecting structure and defines an audio speaker opening with the projecting structure at least partially surrounding the audio speaker opening. The foam support structure is shaped and dimensioned to attach to the projecting structure. The foam support structure has a receiving surface. The foam member is shaped to conform to the foam support structure and is installed to the receiving surface.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
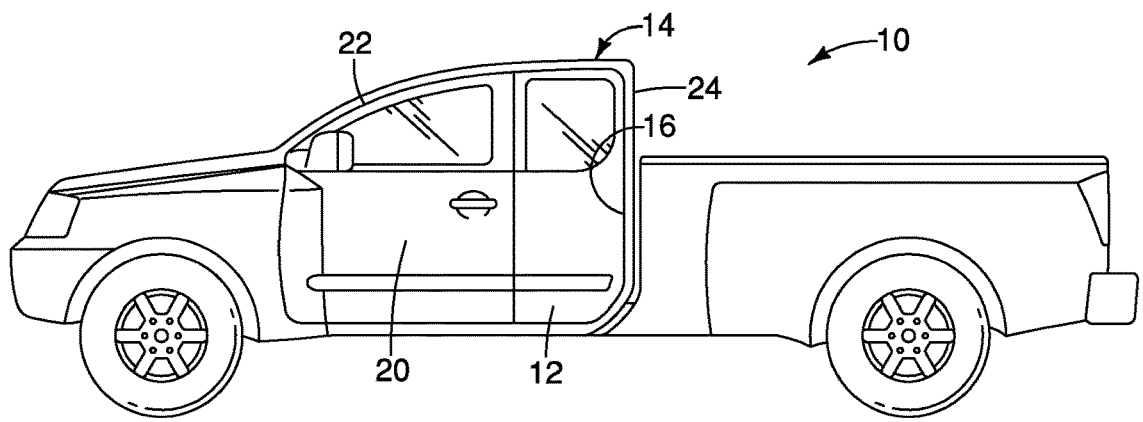
FIG. 1 is a side view of a vehicle that includes a vehicle body assembly in accordance with a first embodiment.

Referring initially to FIG. 1, a vehicle 10 having a vehicle body assembly 12 is illustrated in accordance with a first embodiment.

The vehicle 10 includes a vehicle body structure 14 that defines a door opening 16 that provides access to a passenger compartment 18. In addition to the vehicle body assembly 12, the vehicle 10 includes a front door 20. The front door 20 and the vehicle body assembly 12 are movable between respective open orientations (not shown) and closed orientations, as shown in FIG. 1. The vehicle body assembly 12 is shown removed from the vehicle 10 in FIG. 2. In the depicted first embodiment, the vehicle body assembly 12 is a rear door of the vehicle 10. However, it should be understood from the drawings and the description herein that the vehicle body assembly 12 can be any portion of the vehicle body structure 14 that includes an audio speaker S mounted thereto, and is not limited to a door assembly.

The vehicle 10 depicted in the first embodiment is a pickup truck in what is referred to as a king-cab design with four doors, two doors on each side. As shown in FIG. 1, the front door 20 is a conventionally sized door that pivots on hinges (not shown) that are fixed to an A-pillar structure 22 of the vehicle body structure 14. The vehicle body assembly 12 pivots about hinges (not shown) that are fixed to a rear pillar structure 24. The vehicle body assembly 12 is slightly smaller than a conventionally sized door. However, it should be understood that the features of the vehicle body assembly 12 (a vehicle rear door in the first embodiment) having the features described hereinbelow can be any of a number of door designs and is not limited to the king-cab door referred to herein as the vehicle body assembly 12.

Figure 2:
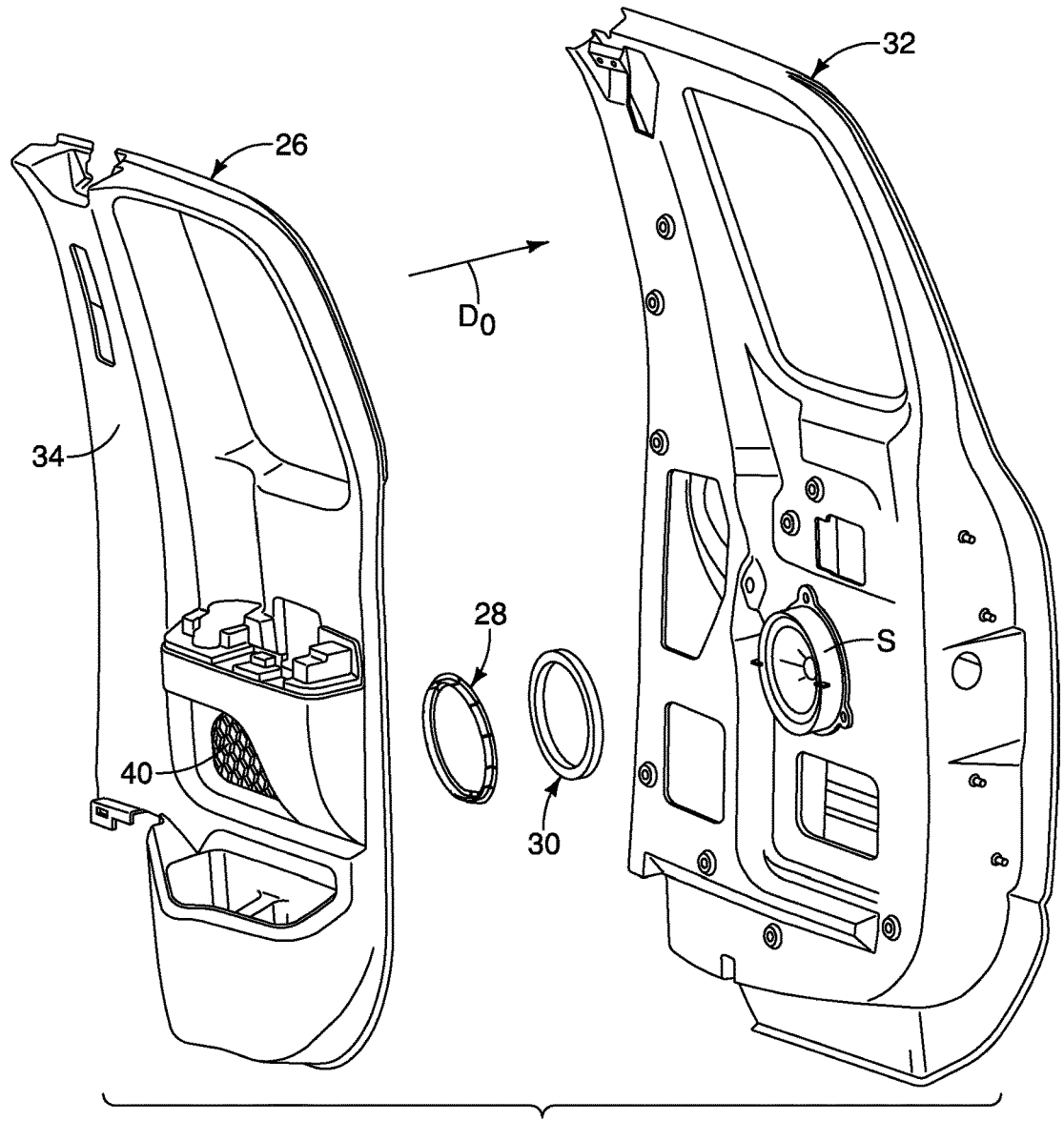
FIG. 2 is an exploded perspective view of the vehicle body assembly removed from the vehicle showing a door panel with an audio speaker installed thereto, a foam member, a foam support structure and an interior trim panel in accordance with the first embodiment.
Figure 3:
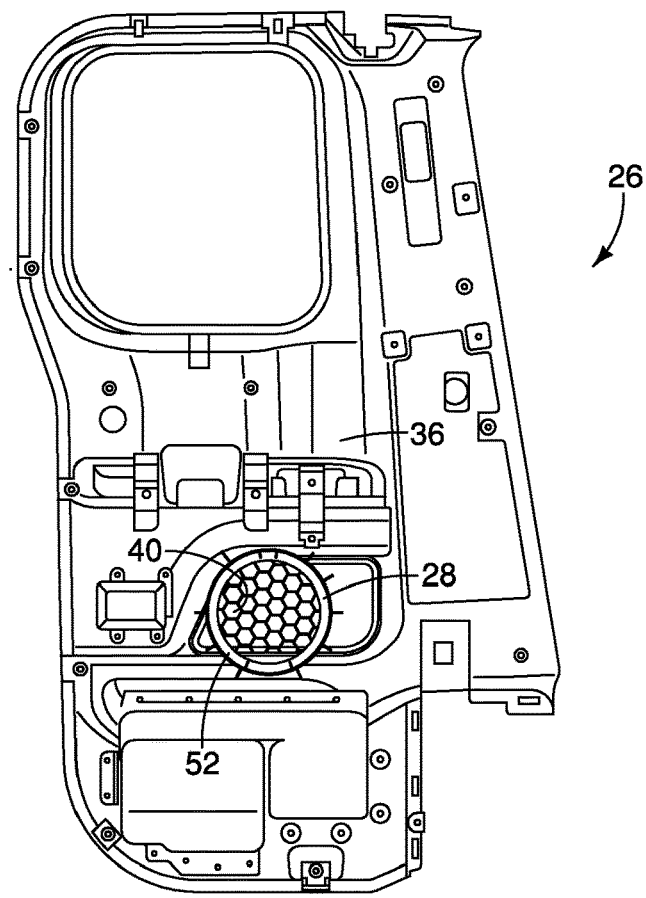
FIG. 3 is a side view of the interior trim panel removed from the vehicle body assembly showing an audio speaker opening surrounded by a projecting structure in accordance with the first embodiment.
Figure 4:
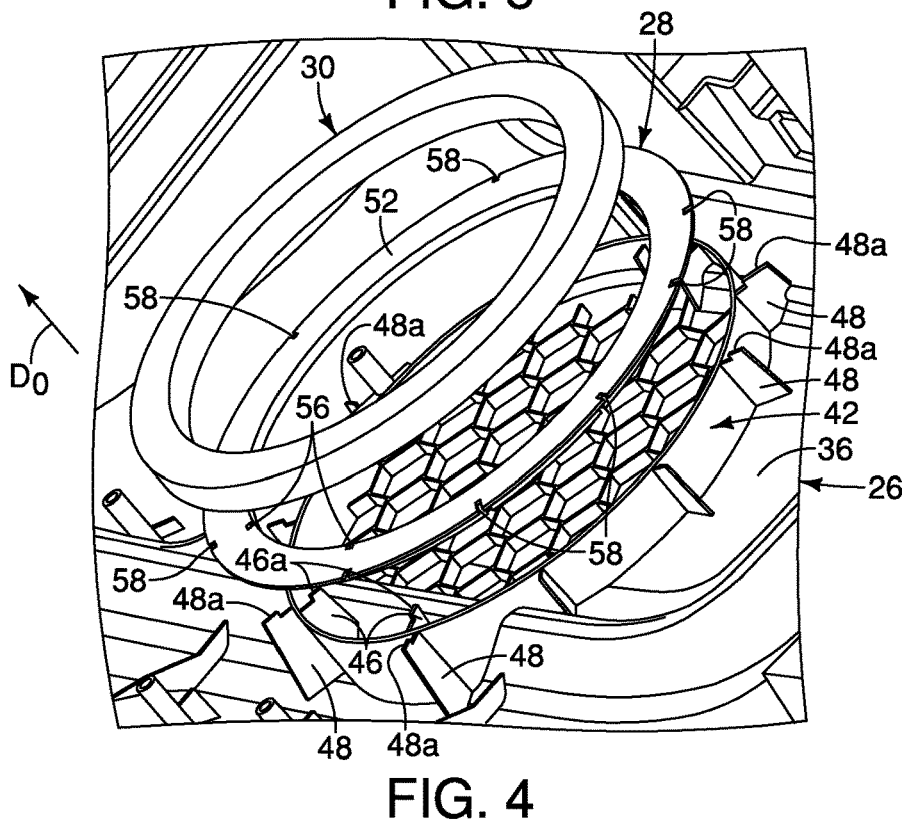
FIG. 4 is an exploded perspective view of a portion of the interior trim panel showing the projecting structure surrounding the audio speaker opening, the foam support structure and the foam member in accordance with the first embodiment.
Figure 5:
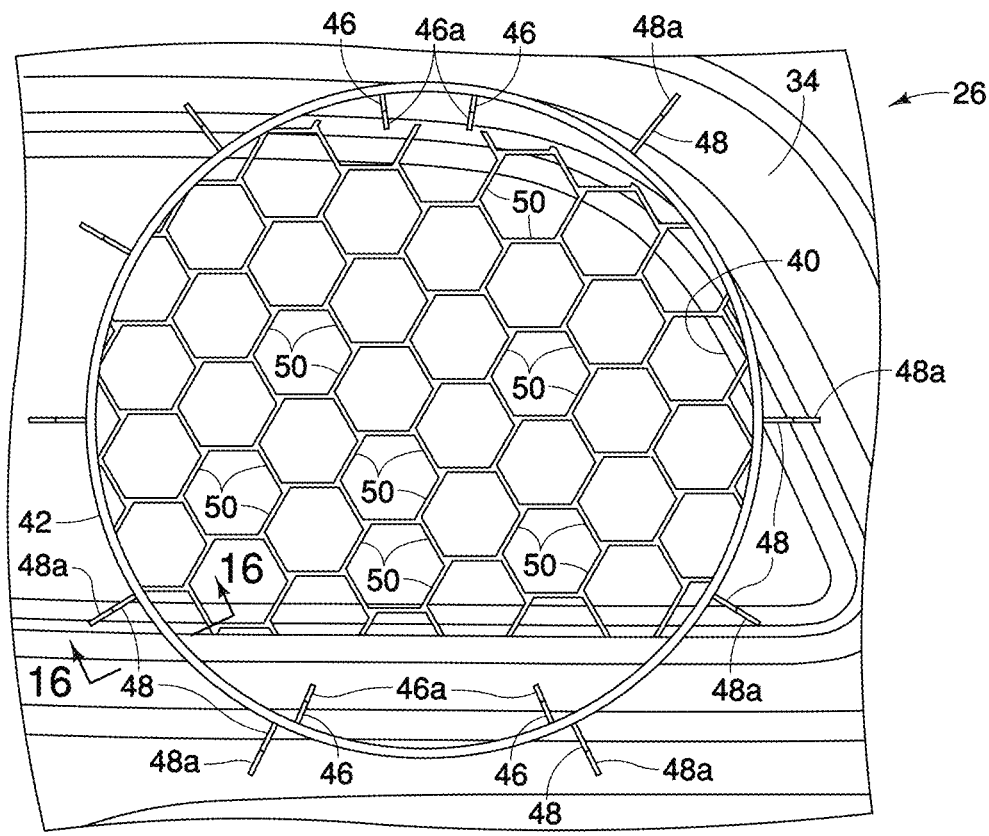
FIG. 5 is a plan view of the portion of the interior trim panel depicted in FIG. 4 showing the projecting structure, first flanges extending radially inward therefrom and second flanges extending radially outward therefrom in accordance with the first embodiment.

As shown in FIG. 2 in an exploded view, the vehicle body assembly 12 includes an interior trim panel 26, a foam support structure 28, a foam member 30 and a body panel 32, as described in greater detail below.

The interior trim panel 26 is configured and dimensioned to attach to the body panel 32 in a conventional manner. For example, the interior trim panel 26 attaches to the body panel 32 via mechanical fasteners, snap-fitting structures, adhesive materials, or other mechanical means. Since such attachment structures are well known and conventional to the art, further description of the attachment between the interior trim panel 26 and the body panel 32 is omitted for the sake of brevity.

As shown in FIGS. 3-8, the interior trim panel 26 has an interior or inboard surface 34 (shown in FIG. 3) and an outboard surface 36, with portions of the outboard surface 36 being shown in FIGS. 4-8 and 16. The interior trim panel 26 is basically a contoured panel with shapes and contours that are provided in accordance with an overall appearance of an interior design of the passenger compartment 18. Such shapes and contours can vary from vehicle to vehicle. The shapes and contours depicted in FIG. 3 of the inboard surface 34 of the interior trim panel 26 are just one example of shapes and contours on an interior trim panel and are not intended to limit appearance of the interior trim panel 26.

Figure 16:
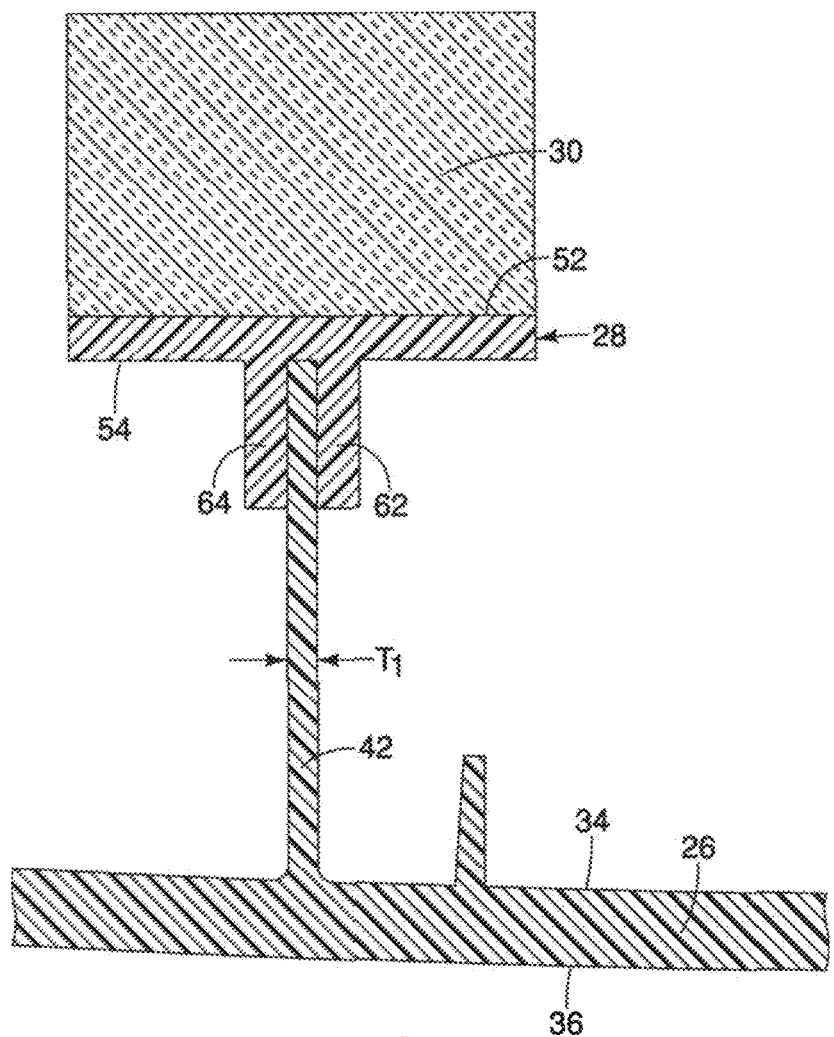
FIG. 16 is a cross-sectional view of the interior trim panel with the foam support structure attached to the projecting structure taken along the line 16-16 in FIG. 5 in accordance with the first embodiment.

The interior trim panel 26 includes has an audio speaker opening 40 that extends from the inboard surface 34 to the outboard surface 36. The interior trim panel 26 also includes a projecting structure 42 that extends perpendicular to the adjacent portions of the outboard surface 36, as shown in FIG. 16. The projecting structure 42 at least partially encircles or at least partially surrounds and defines the audio speaker opening 40. In the depicted first embodiment, the projecting structure 42 is basically a rib or annular ring that encircles or at least partially encircles the audio speaker opening 40. As shown in cross-section in FIG. 16, the projecting structure 42 is a thin wall-like structure that basically extends in an outboard direction $D_o$ from the outboard surface 36 of the interior trim panel 26 and is generally circular in shape, but is not limited to having a circular shape. Further, in the depicted embodiment, the projecting structure 42 is perpendicular or approximately perpendicular to the outboard surface 36 of the interior trim panel 26 in the outboard direction $D_o$. However, depending upon the shapes and contours of the inboard surface 34, the outboard surface 36 can have corresponding or complimentary contours and shapes such that the projecting structure 42 and the outboard surface 36 of the interior trim panel 26 can define an angle (not shown) therebetween that is between 75 and 90 degrees.

Further, in the depicted first embodiment, the projecting structure 42 is a single main flange that extends entirely around the audio speaker opening 40. Alternatively, the projecting structure 42 can be a plurality of separate flanges that together define a predetermined shape, such as a circular shape, an oval or elliptical shape, or other predetermined shape corresponding to the shape of the audio speaker opening 40.

Figure 6:
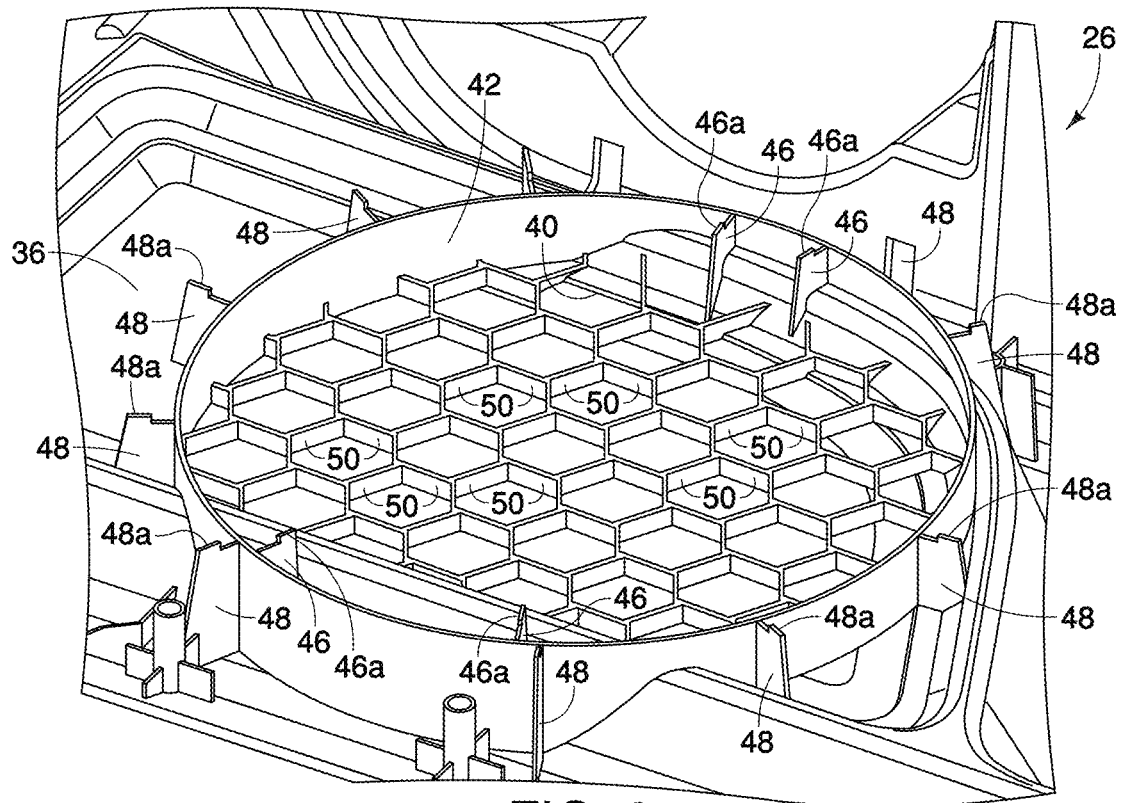
FIG. 6 is a perspective view of the portion of the interior trim panel depicted in FIGS. 4 and 5, further showing the projecting structure, first flanges extending radially inward therefrom and second flanges extending radially outward therefrom in accordance with the first embodiment.
Figure 7:
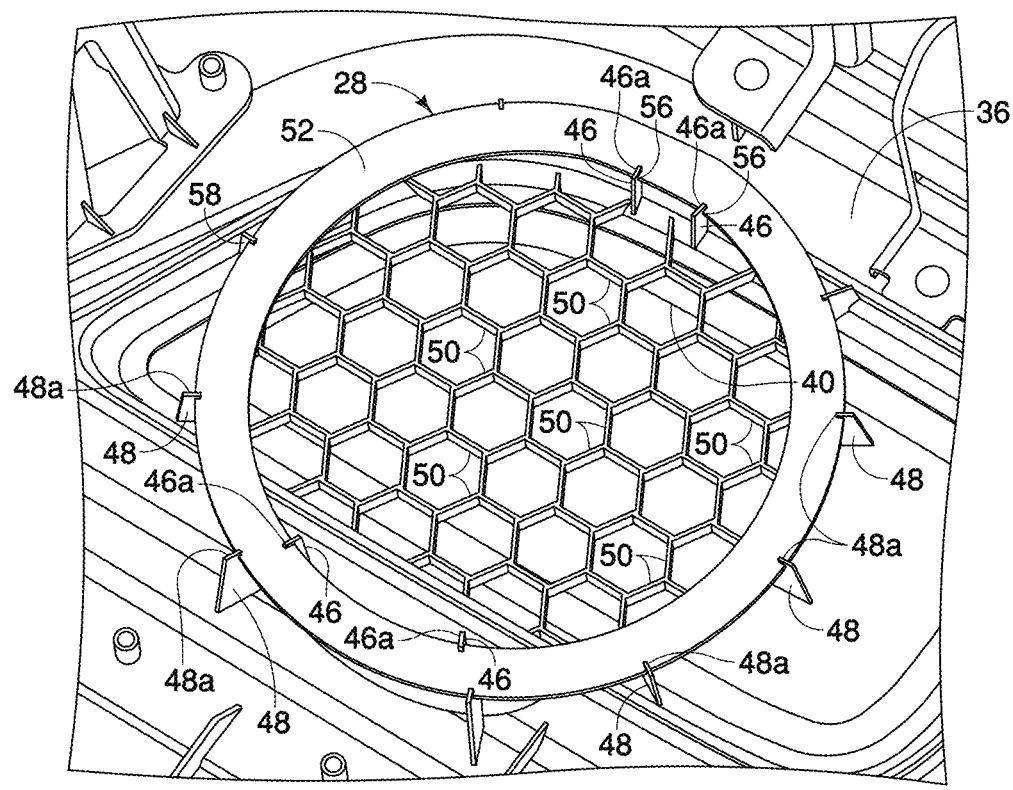
FIG. 7 is a perspective view of the portion of the interior trim panel depicted in FIGS. 4, 5 and 6, with the foam support structure installed to the projecting structure, the first flanges and the second flanges in accordance with the first embodiment.
Figure 8:
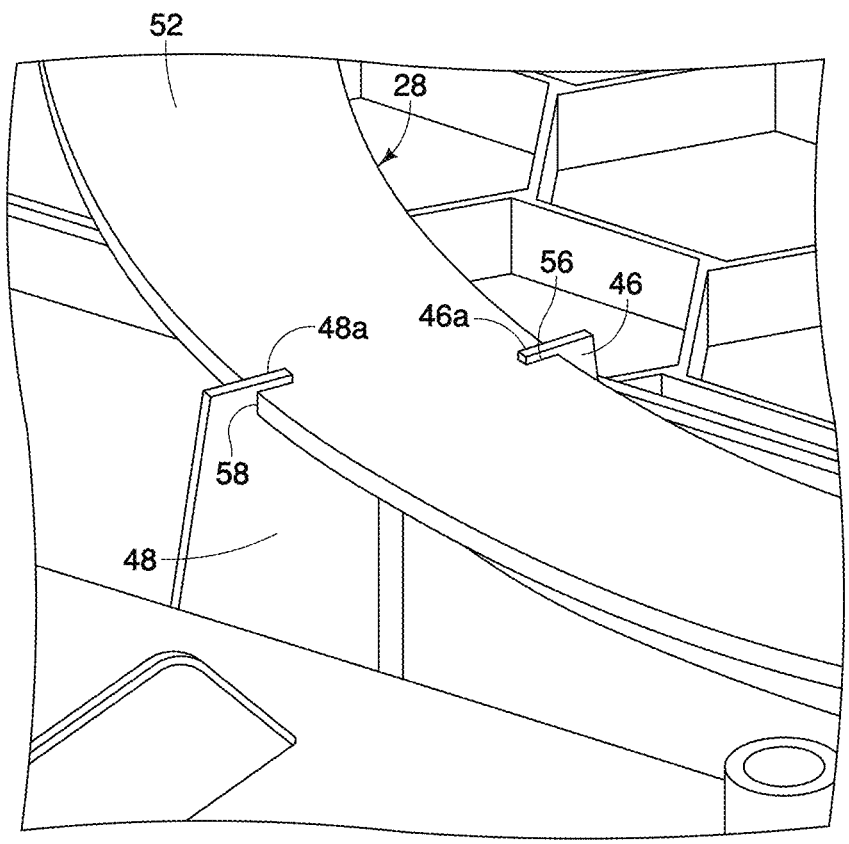
FIG. 8 is another perspective view of the portion of the interior trim panel also showing the foam support structure installed to the projecting structure, the first flanges and the second flanges of the interior trim panel in accordance with the first embodiment.
Figure 9:
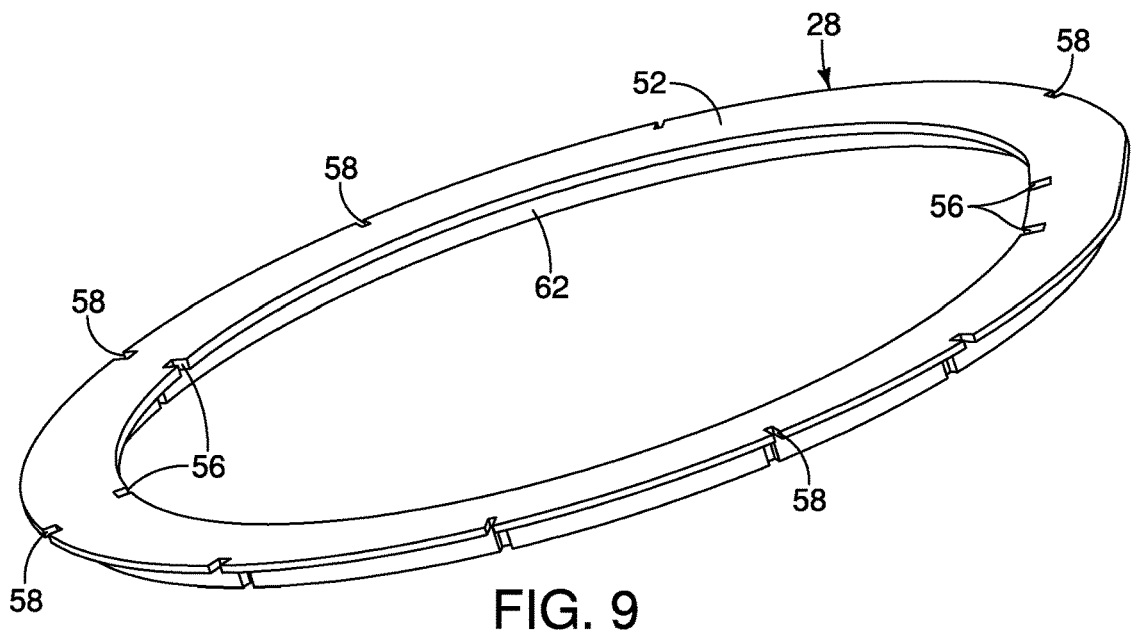
FIG. 9 is a perspective view of the foam support structure removed from the interior trim panel showing first recesses and second recessed formed along inner and outer peripheries of the foam support structure in accordance with the first embodiment.
Figure 10:
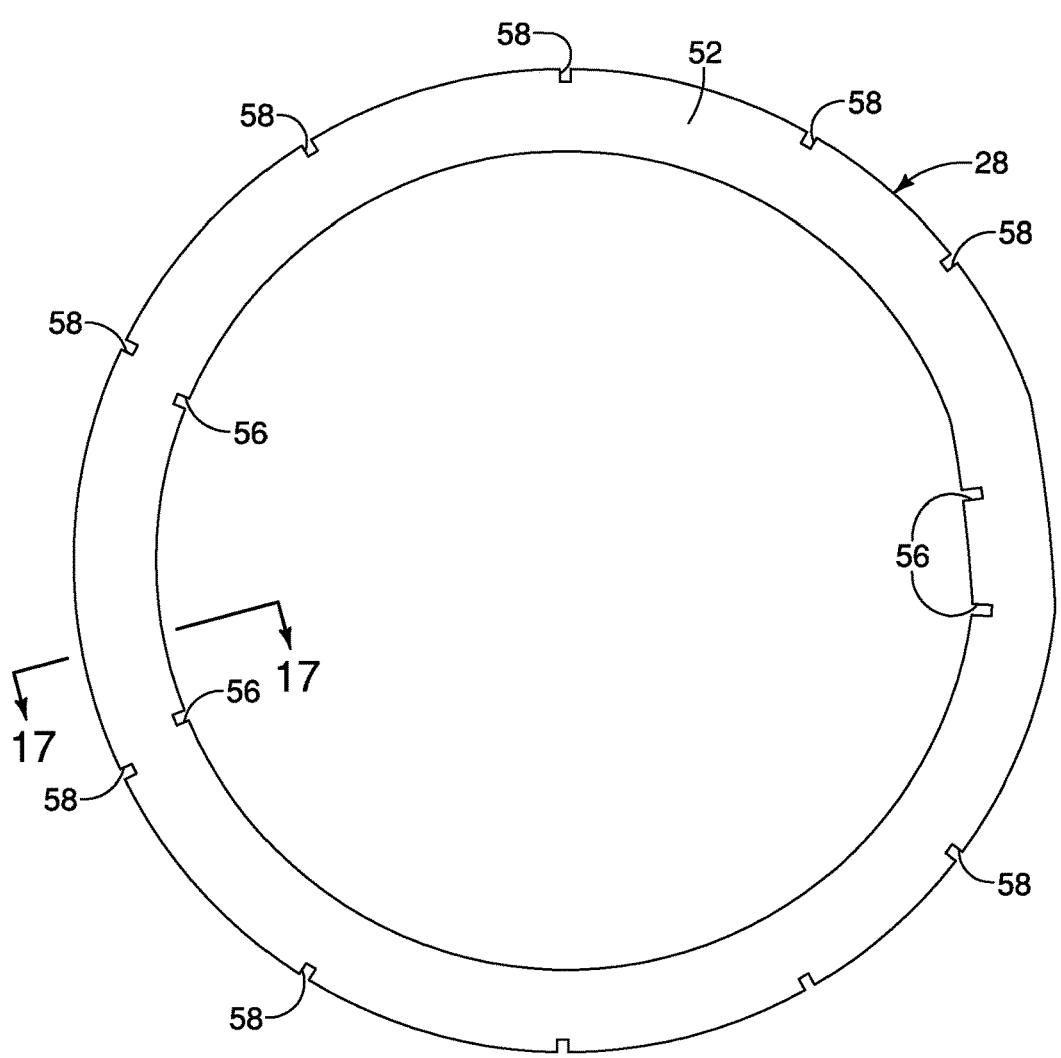
FIG. 10 is a plan view of the foam support structure removed from the interior trim panel showing an outboard surface thereof with first recesses and second recessed formed along inner and outer peripheries of the foam support structure in accordance with the first embodiment.
Figure 11:
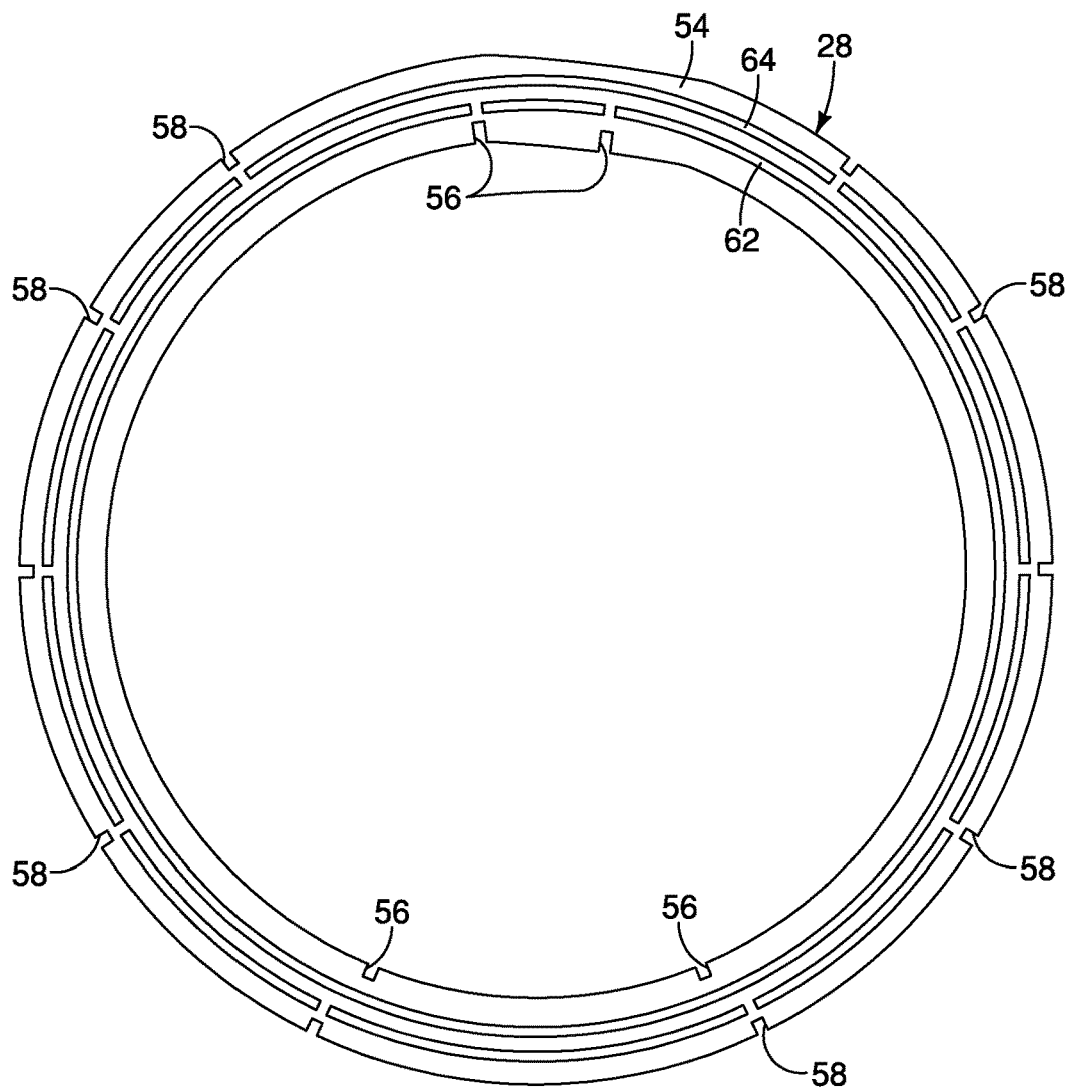
FIG. 11 is a plan view of the foam support structure removed from the interior trim panel showing an inboard surface thereof with a radially inner flange, a radially outer flange, the first recesses and the second recesses in accordance with the first embodiment.
Figure 12:
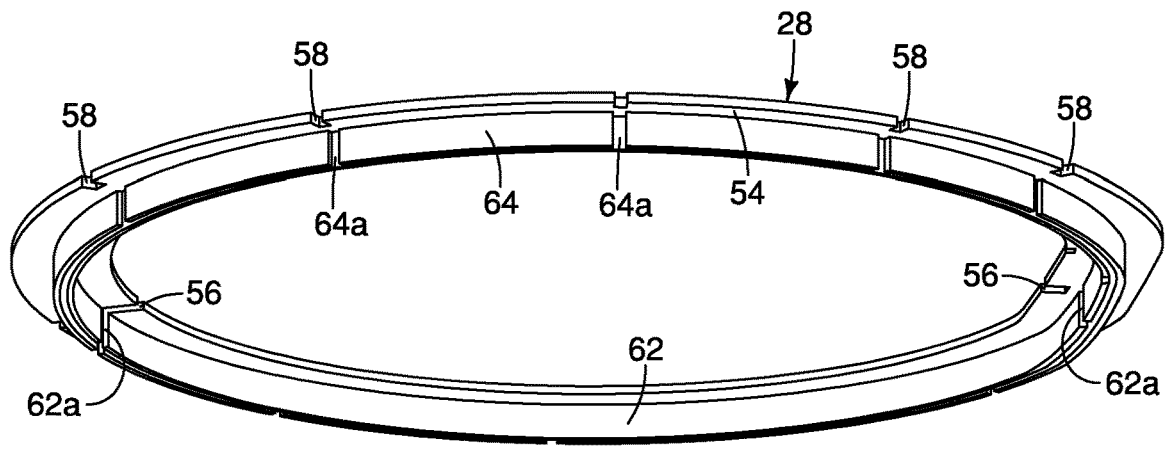
FIG. 12 is a perspective view of the foam support structure removed from the interior trim panel showing the radially inner flange and the radially outer flange extending from the inboard surface in accordance with the first embodiment.
Figure 13:
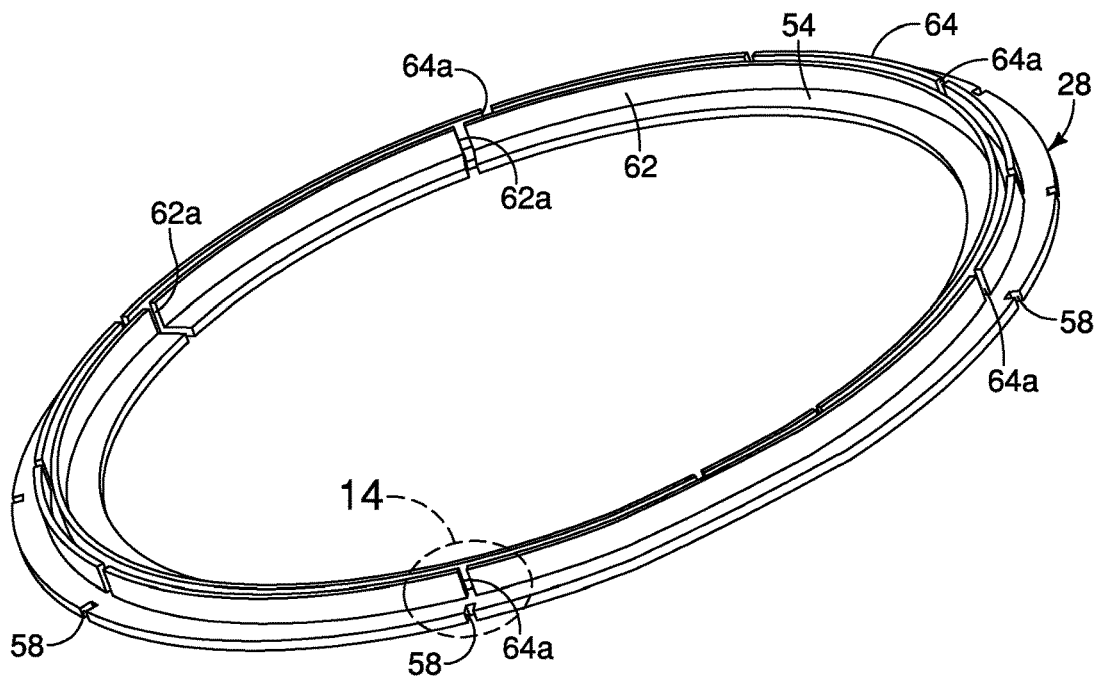
FIG. 13 is another perspective view of the foam support structure removed from the interior trim panel showing the radially inner flange and the radially outer flange extending from the inboard surface in accordance with the first embodiment.
Figure 14:
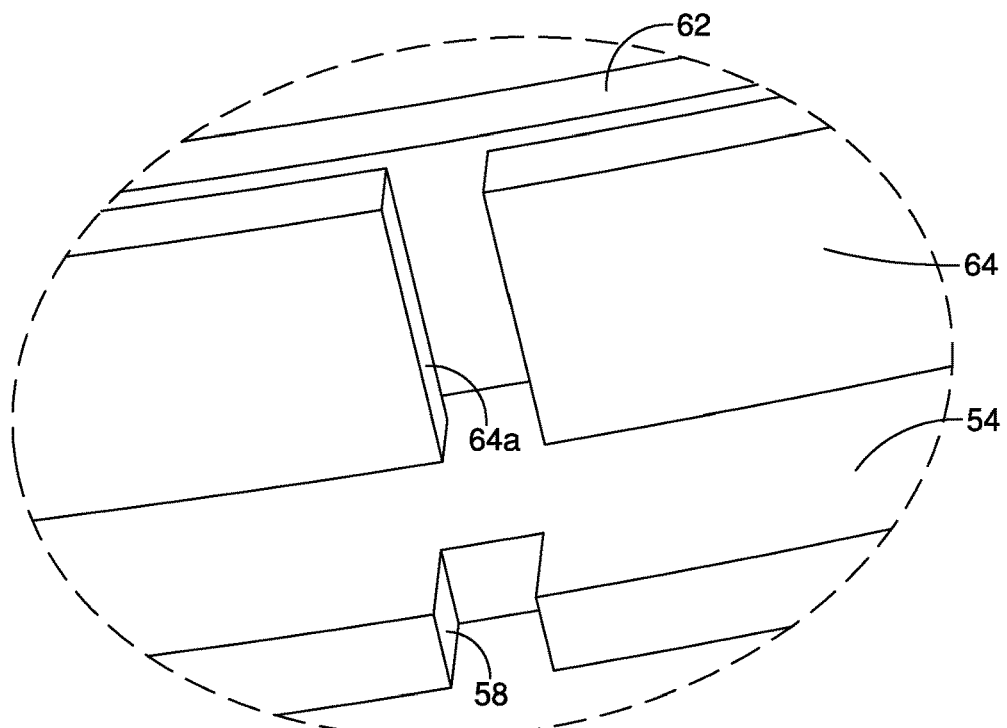
FIG. 14 is a perspective view of the foam support structure showing features of the radially inner flange and the radially outer flange within the circle in FIG. 13, in accordance with the first embodiment.
Figure 15:
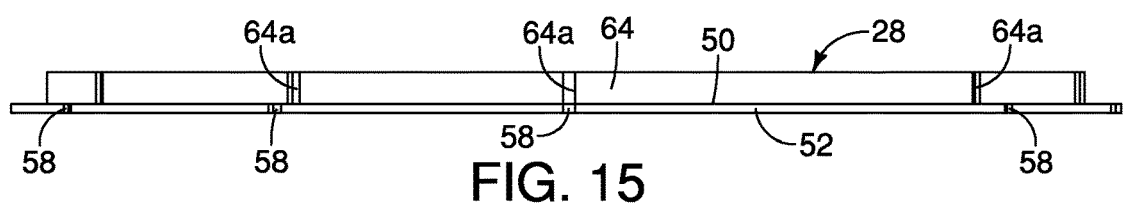
FIG. 15 is an end view of the foam support structure in accordance with the first embodiment.

The projecting structure 42 includes a plurality of first flanges 46 that extend radially inward within the audio speaker opening 40 and a plurality of second flanges 48 that extends radially outward away from the audio speaker opening 40. As shown in FIG. 6, each of the plurality of first flanges 46 includes a corresponding extension 46a that has a reduced width as compared to the remainder of the corresponding first flange 46. Each of the extensions 46a extends beyond the end of the adjacent portion of the first flange 46. Further, the extensions 46a are located radially inward of and spaced apart from the projecting structure 42.

In the depicted first embodiment, there are only four of the first flanges 46. However, more or fewer first flanges 46 can be employed.

As is also shown in FIG. 6, each of the plurality of second flanges 48 includes a corresponding extension 48a that has a reduced width as compared to the remainder of the corresponding second flange 48. Each of the extensions 48a extends beyond the end of the adjacent portion of the second flange 48. Further, the extensions 48a are located radially outward of and spaced apart from the projecting structure 42. In the depicted first embodiment, there are at least eight of the second flanges 48. However, more or fewer second flanges 48 can be employed.

The interior trim panel 26 further includes a plurality of ribs 50 shaped and dimensioned to define an audio speaker grill that extends between predetermined locations along the projecting structure 42 such that the plurality of ribs 50 span the audio speaker opening 40 defining a speaker grill that partially covers the audio speaker opening 40.

The interior trim panel 26 can be manufactured using any of a variety of materials and/or combinations of materials. The portion of the interior trim panel 26 that defines the projecting structure 42, the first flanges 46, the second flanges 48 and the ribs 50 are made of a molded plastic or polymer material. In an alternative embodiment, the projecting structure 42, the first flanges 46 and the second flanges 48 can be made of a first material and the ribs 50 can be made of a second material that differs from the first material, such as a metallic material or plastic/polymer material coated or plated with metal such as chrome.

As shown in FIGS. 2 and 6-17, the foam support structure 28 is shaped and dimensioned to attach to the projecting structure 42 of the interior trim panel 26. The foam support structure 28 of the first embodiment is basically an overall annular shape with an outboard facing surface 52 and an inboard surface 54. The outboard facing surface 52 is hereinafter referred to as a receiving surface 52 and is preferable flat. In the depicted first embodiment, the foam support structure 28 has an overall circular shape but is not limited to a circular, annular or round shape. The receiving surface 52 is further shaped and dimensioned to contact and engage the foam member 30, as described herein below.

The receiving surface 52 of the foam support structure 28 is generally flat but includes a plurality of first recesses 56 and a plurality of second recesses 58 that extend to the inboard surface 54. The first recesses 56 can be aligned with the second recesses 58 or can be offset from one another, as shown in FIGS. 9-15.

The first recesses 56 are located, dimensioned and oriented along the inner periphery of the foam support structure 28 such that when the foam support structure 28 is attached to the projecting structure 42, the extensions 46a of the first flanges 46 of the projecting structure 42 fit into the fit into corresponding ones of the first recesses 56. Similarly, the second recesses 58 are located, dimensioned and oriented along the outer periphery of the foam support structure 28 such that when the foam support structure 28 is attached to the projecting structure 42, the extensions 48a of the first flanges 48 of the projecting structure 42 fit into the fit into corresponding ones of the second recesses 58, as described further below.

The inboard surface 54 of the foam support structure 28 include structures that attach to the projecting structure 42. Specifically, as shown in FIGS. 2, 9 and 11-15, the inboard surface 54 of the foam support structure 28 includes at least one radially inner flange 62 and at least one radially outer flange 64 relative to the audio speaker opening 40.

The radially inner flange 62 and the radially outer flange 64 can be formed as co-axial, continuous flanges that encircle the audio speaker opening 40 (with the foam support structure 28 installed to the interior trim panel 26), or, can be a plurality of flanges with small gaps 62a and 64a, as shown in FIGS. 11-15. In other words, the radially inner flange 62 can include a plurality of curved flange portions that are spaced apart from one another, but together define an overall annular shape. Similarly, the radially outer flange 64 can include a plurality of curved flange portions that are spaced apart from one another, but together define an overall annular shape. Further, the radially inner flange 62 can include a plurality of small straight flange portions that are spaced apart from one another, but together define an overall annular shape. Similarly, the radially outer flange 64 can include a plurality of small straight flange portions that are spaced apart from one another, but together define an overall annular shape.

Figure 17:
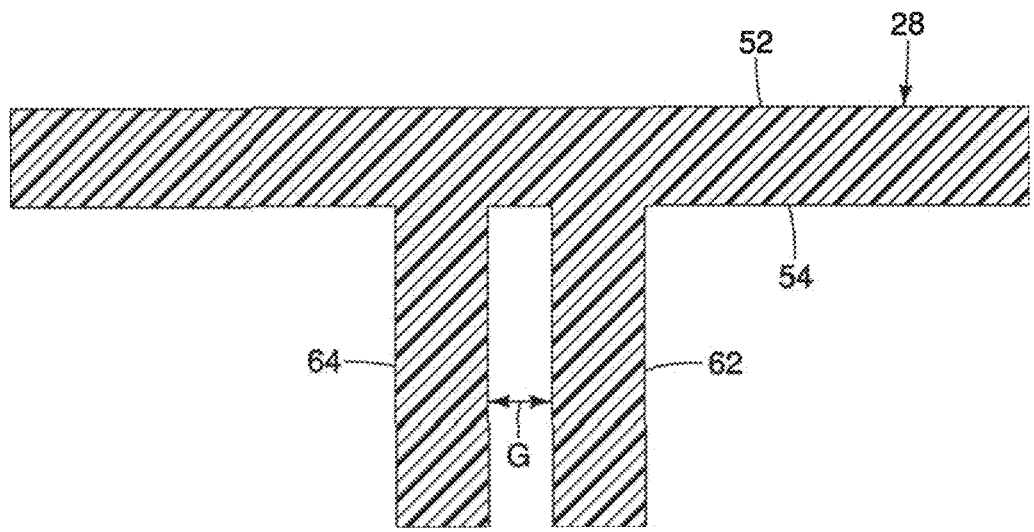
FIG. 17 is a cross-sectional view of the foam support structure along the line 17-17 in FIG. 10 in accordance with the first embodiment.

The radially inner flange 62 and the radially outer flange 64 are spaced apart from one another defining a gap G therebetween, as shown in FIGS. 16-17. The gap G defines a first width that is approximately the same as the overall thickness $T_1$ of the projecting structure 42. When the foam support structure 28 is installed to the interior trim panel 26, the projecting structure 42 can fit into the gap G. By pressing against the receiving surface 52, the projecting structure 42 is pressed to the gap G between the radially inner flange 62 and the radially outer flange 64. Simultaneously, the extensions 46a of the first flanges 46 of the projecting structure 42 are fitted into corresponding ones of the first recesses 56. As well, the extensions 48a of the second flanges 48 of the projecting structure 42 are fitted into corresponding ones of the second recesses 58, thereby securing the foam support structure 28 to the interior trim panel 26.

The foam support structure 28 is preferably made of a molded plastic or polymer material, but can alternatively be made of metal or other suitable material.

The foam member 30 is made of a resilient compressible foam material. The foam member 30 in the first embodiment has a generally annular or ring shape (or close to an annular or ring shape) that is approximately the same shape and size as the receiving surface 52 of the foam support structure 28.

The body panel 32 is preferably a metal structure constructed using conventional manufacturing techniques. The audio speaker S is installed thereto in a conventional manner such that the audio speaker S is oriented to provide sound into the passenger compartment 18 of the vehicle 10.

Prior to installing the interior door assembly 12 to the body panel 32, the foam member 30 is placed on either an outer periphery of the audio speaker S or directly to the foam support structure 18, which is installed to the projecting structure 42 of the interior trim panel 26. When the interior door assembly 12 installed to the body panel 32, the foam member 30 is slightly compressed forming a seal between the outer periphery of audio speaker S and the foam support structure 28. The compressed foam member 30 suppresses creaking and/or rattling noises, and unwanted vibrations due to audio speaker loudness that might otherwise occur in the absence or mis-alignment of the foam member 30.

The foam support structure 28 has a relatively wide outboard surface 36 that is as wide or wider than the annular width of the foam member 30. Therefore, when the foam member 30 is placed on the outboard surface 36 with either an adhesive or double sided adhesive tape, the foam member 30 and the outboard surface 36 of the foam support structure 28 have very large surface areas such that a reliable bond is established therebetween. Therefore, over the life of the vehicle 10 and the audio speaker S, the foam member 30 remains in its installed position and is prevented from moving out of position.

Second Embodiment

Referring now to FIGS. 18-23, a vehicle 110 with a vehicle body assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 19:
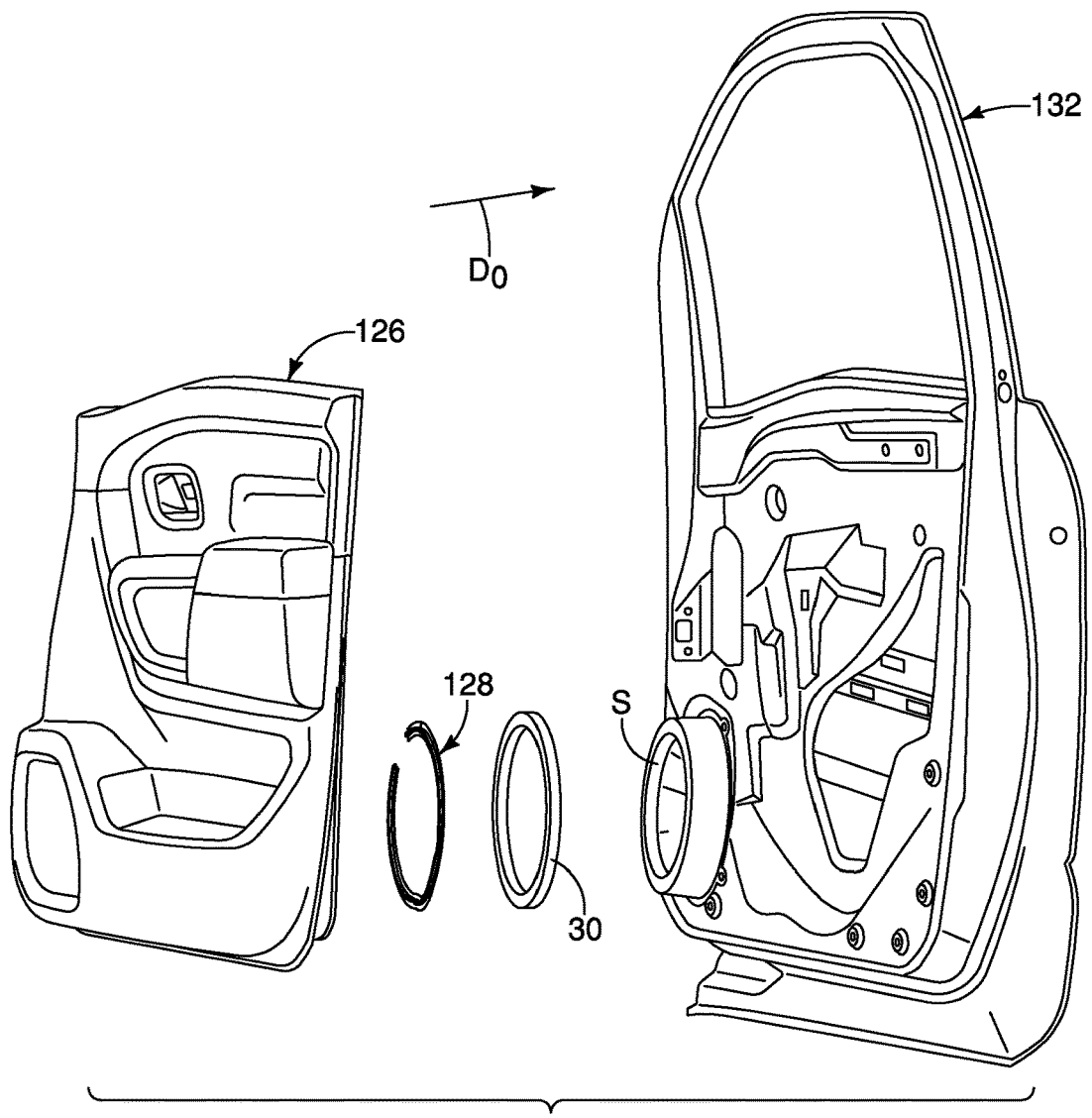
FIG. 19 is an exploded perspective view of the vehicle body assembly removed from the vehicle showing a door panel with an audio speaker installed thereto, a foam member, a foam support structure and an interior trim panel in accordance with the second embodiment.
Figure 20:
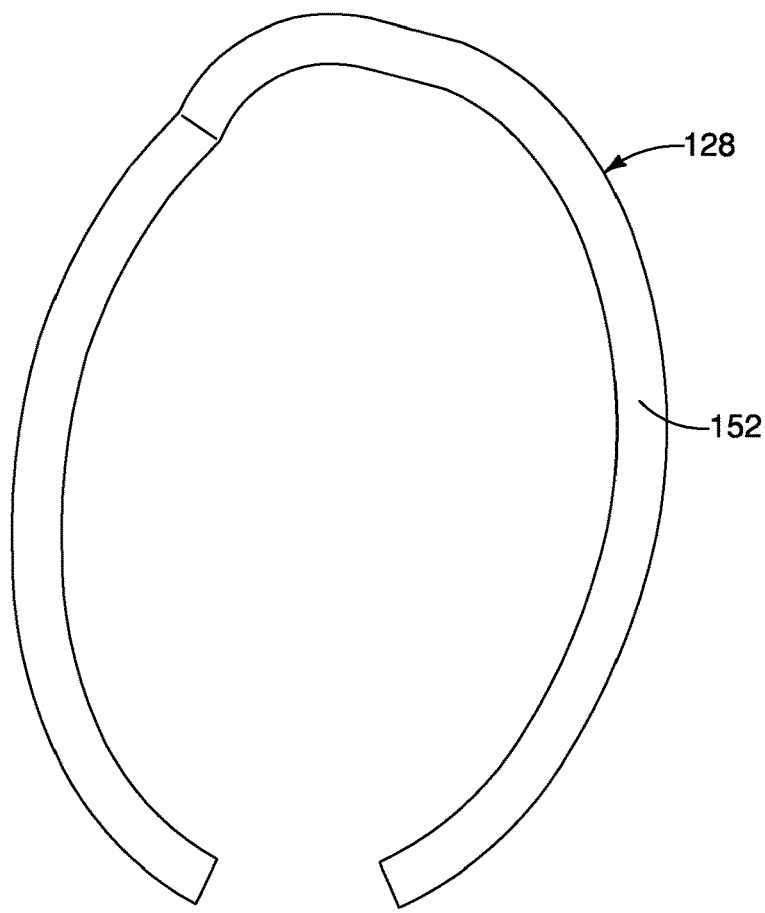
FIG. 20 is a plan view of the foam support structure removed from the interior trim panel showing an outboard surface thereof in accordance with the second embodiment.

In the second embodiment, the vehicle body assembly 112 is a rear door of the vehicle 110, where the vehicle 110 is a crew-cab style pickup truck. As shown in FIG. 19, the vehicle body assembly 112 includes an interior trim panel 126, a foam support structure 128, the foam member 30 and a door outer panel 132. The vehicle body assembly 112 is a rear door of the vehicle 110. The interior trim panel 126 includes structures and/or projections that can interfere with the positioning of the foam support structure 128 of the first embodiment. Therefore, in the second embodiment, a foam support structure 128 is employed and includes a receiving surface 152 and an inboard surface 154. The foam support structure 128 is an incomplete oblong ring or oval having an irregular shape that is provided with various non-circular areas to avoid structures on either the interior trim panel 126 and/or the door outer panel 132. The foam member 30 can be employed in the second embodiment but is deliberately installed to the receiving surface 152 in such a way so as to conform to the irregular or oblong shape of the foam support structure 128 and the receiving surface 152. Alternatively, the foam member 30 can be formed with the same irregular or oblong shape as the foam support structure 128 and the receiving surface 152.

Figure 21:
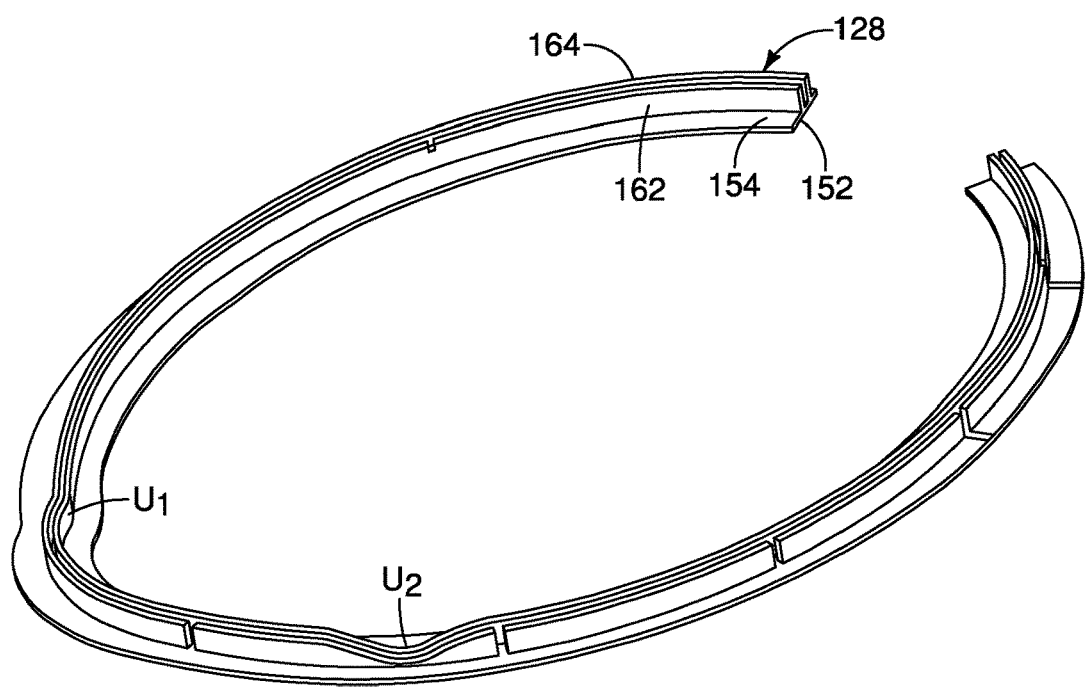
FIG. 21 is a perspective view of the foam support structure removed from the interior trim panel showing an inboard surface thereof with a radially inner flange and a radially outer flange extending from the inboard surface in accordance with the second embodiment.
Figure 22:
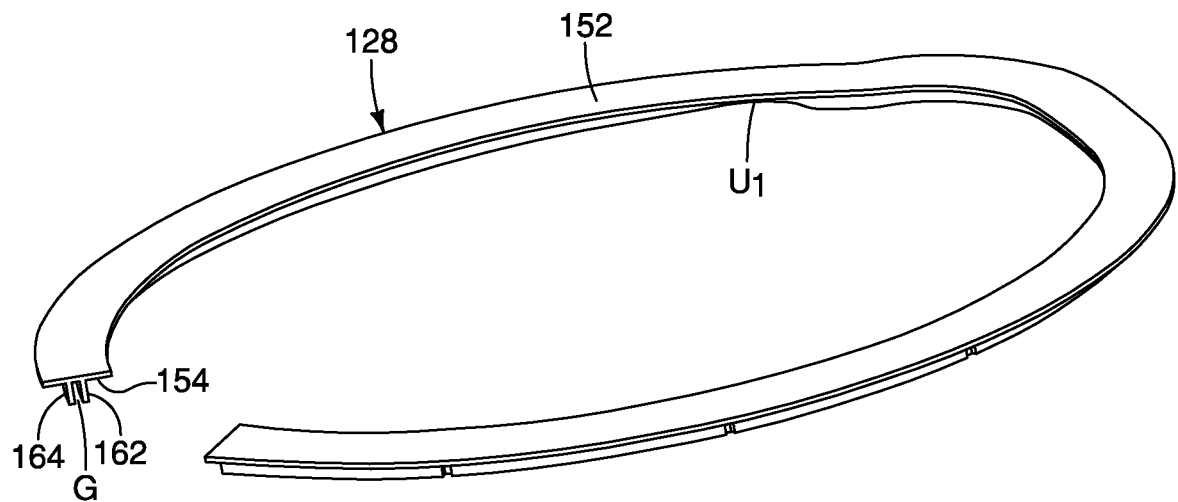
FIG. 22 is another perspective view of the foam support structure removed from the interior trim panel showing the outboard surface thereof with the radially inner flange and the radially outer flange extending from the outboard surface in accordance with the second embodiment.
Figure 23:
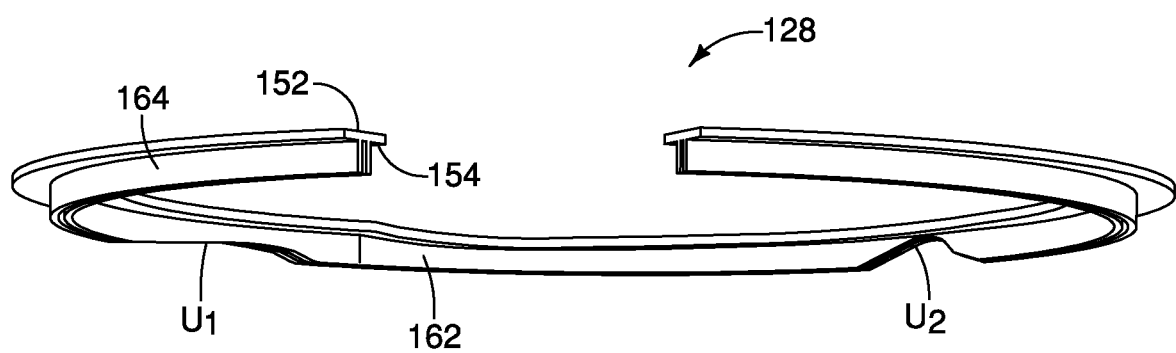
FIG. 23 is yet another perspective view of the foam support structure showing an inboard surface, the radially inner flange and the radially outer flange extending from the inboard surface in accordance with the second embodiment.

As shown in FIGS. 21-23, the inboard surface 154 of the foam support structure 28 includes a radially inner flange 162 and a radially outer flange 164. The radially inner flange 162 and the radially outer flange 164 are provided with the same irregular or oblong shape as the receiving surface 152. The radially inner flange 162 and the radially outer flange 164 also include undulated areas $U_1$ and $U_2$ where the profile of the radially inner flange 162 and the radially outer flange 164 changes from a predetermined projecting distance from the inboard surface 154 then sloping to have little or no height or distance from the inboard surface 154. In other words, the radially inner flange 162 and the radially outer flange 164 are actually a plurality of curved segments with gaps defined therebetween by the undulated areas $U_1$ and $U_2$.

It should be understood from the drawings and the description of the second embodiment, that the projecting structure (not shown) of the interior trim panel 126 has approximately the same irregular or oblong shape as the inner flange 162 and outer flange 162 of the foam support structure 128.

Third Embodiment

Figure 24:
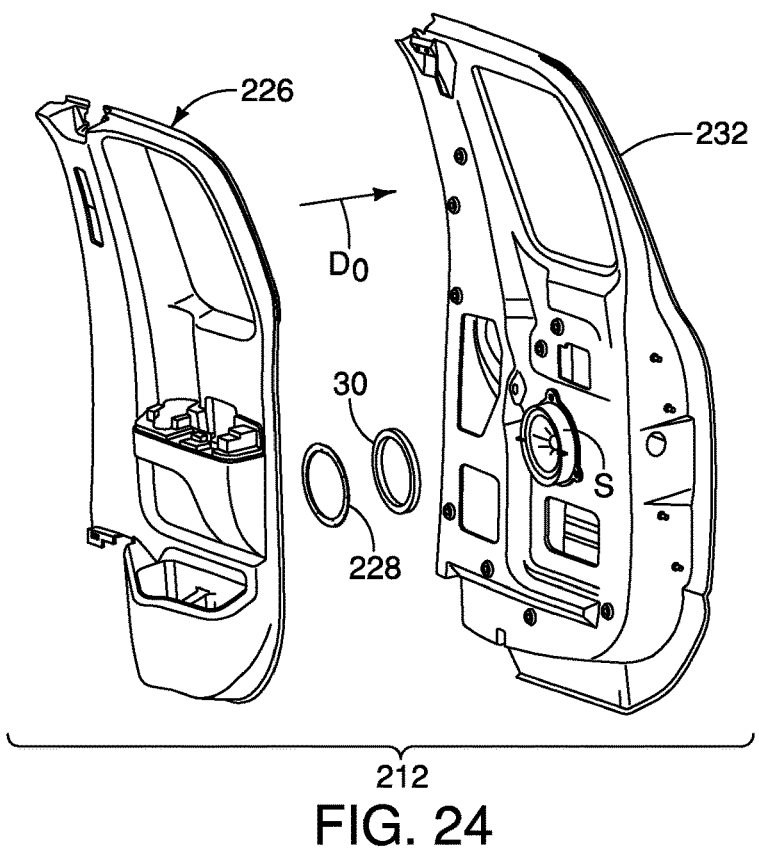
FIG. 24 is an exploded perspective view of a vehicle body assembly removed from the vehicle showing a door panel with an audio speaker installed thereto, a foam member, a foam support structure and an interior trim panel in accordance with a third embodiment.

Referring now to FIG. 24, a vehicle body assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 18:
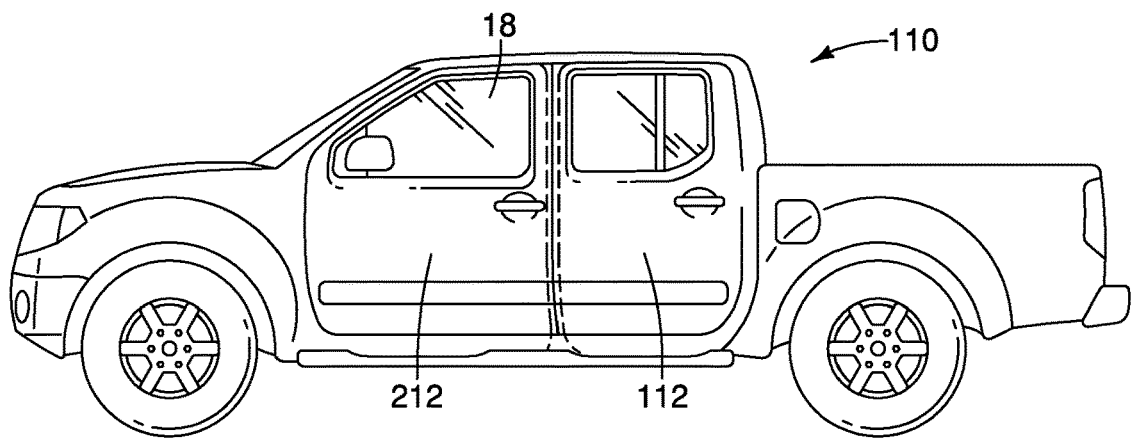
FIG. 18 is a side view of a vehicle that includes a vehicle body assembly in accordance with a second embodiment.

In the third embodiment, the vehicle body assembly 212 is a front door of the vehicle 110 shown in FIG. 18. As shown in FIG. 24, the vehicle body assembly 212 includes an interior trim panel 226, a foam support structure 228, the foam member 30 and a door outer panel 232. The interior trim panel 226 has a truncated height, as compared to the interior trim panels 26 and 126 of the first and second embodiments.

Fourth Embodiment

Figure 25:
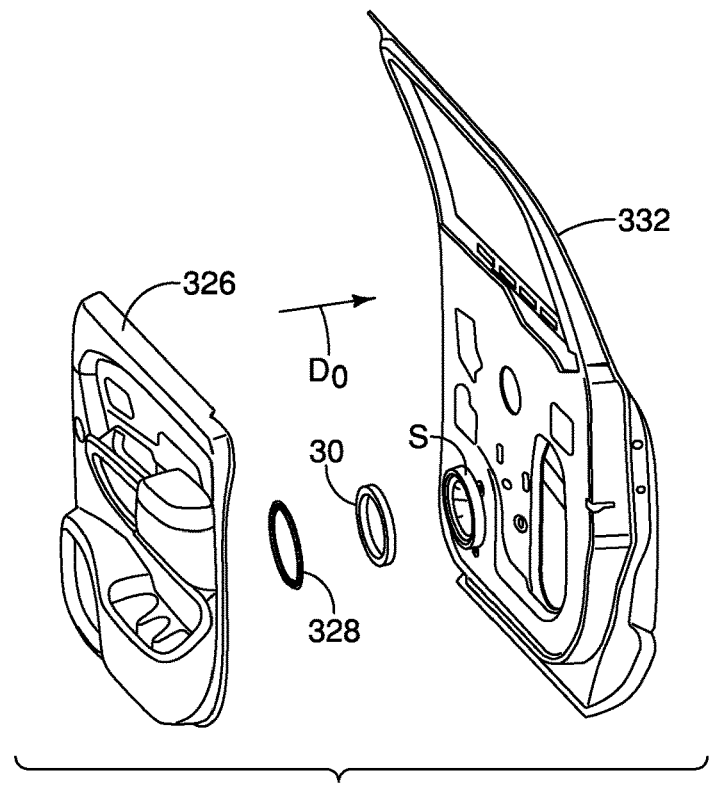
FIG. 25 is an exploded perspective view of a vehicle body assembly removed from the vehicle showing a door panel with an audio speaker installed thereto, a foam member, a foam support structure and an interior trim panel in accordance with a fourth embodiment.

Referring now to FIG. 25, a vehicle body assembly 312 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle body assembly 312 can be either a front door or a rear door of a vehicle. As shown in FIG. 25, the vehicle body assembly 312 includes an interior trim panel 326, a foam support structure 328, the foam member 30 and a door outer panel 332. The door outer panel 332 includes an audio speaker S that has an elliptical shape. Similarly, the foam support structure 328 and the foam member 30 are provided with an elliptical shape.

It should be understood from the drawings and the description herein that the projecting structure (not shown) of the interior trim panel 326 also has an elliptical shape that complements and receives radially inner and outer flanges of the foam support structure 328 is a manner consistent with the description in the first embodiment of the attachment of the foam support member 28 to the projecting structure 42.

The various vehicle structural elements and features other than the interior trim panels, the foam support structures and the foam member (as described above), are conventional components that are well known in the art. Since such elements and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body assembly. Accordingly, these terms, as utilized to describe the present invention should be interpreted relative to a vehicle equipped with the vehicle body assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body assembly, comprising:
an interior trim panel having a projecting structure, the interior trim panel defining an audio speaker opening, the projecting structure at least partially surrounding and defining the audio speaker opening, the projecting structure including a plurality of first flanges that extend radially inward;
a foam support structure shaped and dimensioned to attach to the projecting structure, the foam support structure having a receiving surface, the foam support structure further having a plurality of first recesses located, shaped and dimensioned to receive corresponding ones of the plurality of first flanges with the foam support structure attached to the projecting structure; and
a foam member shaped to conform to the foam support structure, the foam member being attached to the receiving surface.

2. The vehicle body assembly according to claim 1, further comprising
a body panel having an audio speaker attached thereto such that with the foam member attached to the foam support structure and the foam support structure being attached to the projecting structure of the interior trim panel, the foam member is confined between the foam support structure and the audio speaker with the interior trim panel attached to the body panel.

3. The vehicle body assembly according to claim 2, wherein
the body panel is an outer door panel.

4. The vehicle body assembly according to claim 1, wherein
the projecting structure includes a plurality of second flanges that extend radially outward away from the audio speaker opening, and
the foam support structure includes a plurality of second recesses located, shaped and dimensioned to receive corresponding ones of the plurality of second flanges with the foam support structure attached to the projecting structure.

5. The vehicle body assembly according to claim 1, wherein
the projecting structure is an annular projection that at least partially extends around the audio speaker opening.

6. The vehicle body assembly according to claim 1, wherein
each of the projecting structure and the foam support structure has an overall circular shape.

7. The vehicle body assembly according to claim 1, wherein
the projecting structure includes a plurality of projections spaced apart from one another and that extend radially outward from the projecting structure.

8. The vehicle body assembly according to claim 1, wherein
the interior trim panel further includes a plurality of ribs shaped and dimensioned to define an audio speaker grill that extends within the audio speaker opening.

9. A vehicle body assembly, comprising
an interior trim panel having a projecting structure, the interior trim panel defining an audio speaker opening, the projecting structure at least partially surrounding and defining the audio speaker opening, the projecting structure including a plurality of flanges that extend radially outward away from the audio speaker opening;
a foam support structure shaped and dimensioned to attach to the projecting structure, the foam support structure having a receiving surface, the foam support structure including a plurality of recesses located, shaped and dimensioned to receive corresponding ones of the plurality of flanges; and
a foam member shaped to conform to the foam support structure, the foam member being attached to the receiving surface.

10. A vehicle body assembly, comprising
an interior trim panel having a projecting structure, the interior trim panel defining an audio speaker opening, the projecting structure at least partially surrounding and defining the audio speaker opening, the projecting structure including a main flange that extends away from the interior trim panel;
a foam support structure having an inboard surface, the foam support structure being shaped and dimensioned to attach to the projecting structure and the foam support structure having a receiving surface, the receiving surface of the foam support structure being opposite the inboard surface, the inboard surface of the foam support structure including at least one radially inner flange and at least one radially outer flange relative to the audio speaker opening with the main flange of the projecting structure of the interior trim panel being located between the at least one radially inner flange and the at least one radially outer flange with the foam support structure attached to the projecting structure; and
a foam member shaped to conform to the foam support structure, the foam member being attached to the receiving surface.

11. The vehicle body assembly according to claim 10, wherein
- the at least one radially inner flange and the at least one radially outer flange define a gap therebetween defining a width, and
- the main flange has a thickness that is approximately equal to the width of the gap.

12. The vehicle body assembly according to claim 11, wherein
- the at least one radially inner flange and the at least one radially outer flange are perpendicular to the receiving surface of the foam support structure.

13. The vehicle body assembly according to claim 10, wherein
- the at least one radially inner flange and the at least one radially outer flange are perpendicular to the receiving surface of the foam support structure.

\* \* \* \* \*